United States Patent [19]

Hembree et al.

[11] Patent Number: 5,268,093
[45] Date of Patent: * Dec. 7, 1993

[54] PORTABLE WATER PURIFICATION SYSTEM

[75] Inventors: Richard D. Hembree; Brian F. Sullivan, both of Minneapolis, Minn.

[73] Assignee: Recovery Engineering, Inc., Minneapolis, Minn.

[*] Notice: The portion of the term of this patent subsequent to Apr. 21, 2009 has been disclaimed.

[21] Appl. No.: 879,093

[22] Filed: May 1, 1992

Related U.S. Application Data

[63] Continuation of Ser. No. 503,635, Apr. 5, 1990.

[51] Int. Cl.$^5$ ............... B01D 24/08; B01D 35/16
[52] U.S. Cl. .................. 210/136; 210/266; 210/414; 210/415; 210/276; 210/282; 210/416.3; 210/764
[58] Field of Search ............... 210/282, 266, 206, 413, 210/414, 415, 276, 136, 501, 764, 416.3; 422/14, 24, 37, 28

[56] References Cited

U.S. PATENT DOCUMENTS

| Re. 32,537 | 11/1987 | Drori | 210/107 |
|---|---|---|---|
| 492,161 | 2/1893 | Hill | 210/414 |
| 1,130,725 | 3/1915 | Getts | 210/414 |
| 1,386,340 | 8/1921 | Wuster | 210/359 |
| 1,510,863 | 10/1924 | Rose | 210/413 |
| 1,689,277 | 10/1928 | Burns | 210/414 |
| 1,800,757 | 4/1931 | Schlosser | 210/248 |
| 1,987,142 | 1/1935 | Clements, Jr. | 210/167 |
| 1,994,656 | 3/1935 | Liddell | 210/167 |
| 2,338,417 | 1/1944 | Forrest al. | 210/416.5 |
| 2,338,418 | 1/1944 | Forrest et al. | 210/416.5 |
| 2,338,419 | 1/1944 | Forrest et al. | 210/416.5 |
| 2,566,371 | 9/1951 | Quinn | 210/416.3 |
| 2,670,081 | 2/1954 | Quinn | 210/120 |
| 2,869,724 | 1/1959 | McDevitt | 210/94 |
| 3,316,173 | 4/1967 | Mills et al. | 210/62 |
| 3,327,859 | 6/1967 | Pall | 210/282 |
| 3,379,312 | 4/1968 | Brown | 210/415 |
| 3,425,790 | 2/1969 | Sloan | 21/2 |
| 3,436,345 | 4/1969 | Goodenough et al. | 210/62 |
| 3,462,363 | 8/1969 | Mills | 210/37 |
| 3,817,860 | 6/1974 | Lambert et al. | 210/29 |
| 3,870,639 | 3/1975 | Moore et al. | 210/359 |
| 3,887,468 | 6/1975 | Bray | 210/206 |

(List continued on next page.)

FOREIGN PATENT DOCUMENTS

| 40046 | 7/1976 | Israel . |
| 148993 | 7/1920 | United Kingdom . |
| 467134 | 7/1936 | United Kingdom . |

OTHER PUBLICATIONS

*The Fisher Scientific Catalog*, 1988 p. 147.
Marchin and Fina, "Contact and Demand-Release Disinfectants, *Critical Reviews in Environmental Control*", vol. 19, Issue 4, pp. 277-289 1989.
First Need ® purifier product data.
Water Tech water purifier product data.
Katadyn pocket filter product data.

*Primary Examiner*—Stanley S. Silverman
*Assistant Examiner*—Cynthia L. Nessler
*Attorney, Agent, or Firm*—Merchant, Gould, Smith, Edell, Welter & Schmidt

[57] ABSTRACT

A manually operable water purification system which includes (i) a first container having an open end and an outlet orifice, (ii) a filter operably positioned within the first container for filtering contaminated water placed within the first container as the contaminated water is forced toward the outlet orifice in the first container, (iii) a porous body of biocidally effective material operably positioned within the first container for disinfecting the filtered water as the filtered water is forced toward the outlet orifice in the first container, (iv) a plunger sealably receivable within the first container through the open end for forcing contaminated water retained within the first container through the filter and the porous body of biocidally effective material, and (v) a passageway through the plunger provided with a check valve for abating formation of a vacuum within the first container as the plunger is withdrawn from the first container.

11 Claims, 5 Drawing Sheets

U.S. PATENT DOCUMENTS

| | | | |
|---|---|---|---|
| 3,923,665 | 12/1975 | Lambert et al. | 210/501 |
| 3,932,277 | 1/1976 | McDermott et al. | 210/77 |
| 4,069,153 | 1/1978 | Gunther | 210/760 |
| 4,076,622 | 2/1978 | Costin | 210/64 |
| 4,151,092 | 4/1979 | Grimm et al. | 210/256 |
| 4,187,183 | 2/1980 | Hatch | 210/501 |
| 4,190,529 | 2/1980 | Hatch | 210/29 |
| 4,238,477 | 12/1980 | Lambert et al. | 424/79 |
| 4,298,475 | 11/1981 | Gartner | 210/266 |
| 4,389,311 | 6/1983 | La Freniere | 210/198.1 |
| 4,420,590 | 12/1983 | Gartner | 525/357 |
| 4,483,771 | 11/1984 | Koch | 210/490 |
| 4,594,392 | 6/1986 | Hatch | 525/327.1 |
| 4,632,757 | 12/1986 | Rosenberg | 210/414 |
| 4,681,677 | 7/1987 | Kuh et al. | 210/282 |
| 4,694,179 | 9/1987 | Lew et al. | 210/760 |
| 4,769,143 | 9/1988 | Deutsch et al. | 210/266 |
| 4,800,018 | 1/1989 | Moser | 210/266 |
| 4,816,149 | 3/1989 | Wekell | 210/470 |
| 4,857,204 | 8/1989 | Joklik | 210/764 |
| 4,894,154 | 1/1990 | Roz et al. | 210/282 |
| 4,913,808 | 4/1990 | Haque | 210/282 |
| 4,971,687 | 11/1990 | Anderson | 210/232 |
| 4,995,976 | 2/1991 | Vermes et al. | 210/282 |
| 5,032,261 | 7/1991 | Pyper | 210/266 |
| 5,045,195 | 9/1991 | Spangrud et al. | 210/282 |
| 5,061,367 | 10/1991 | Hatch et al. | 210/282 |
| 5,106,500 | 4/1992 | Hembree et al. | 210/282 |

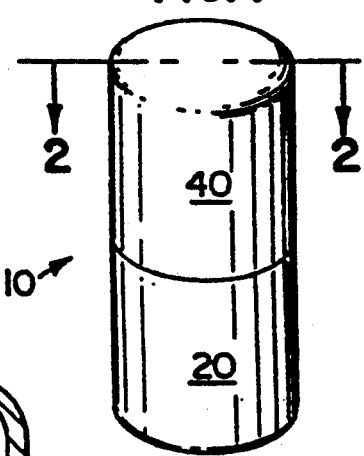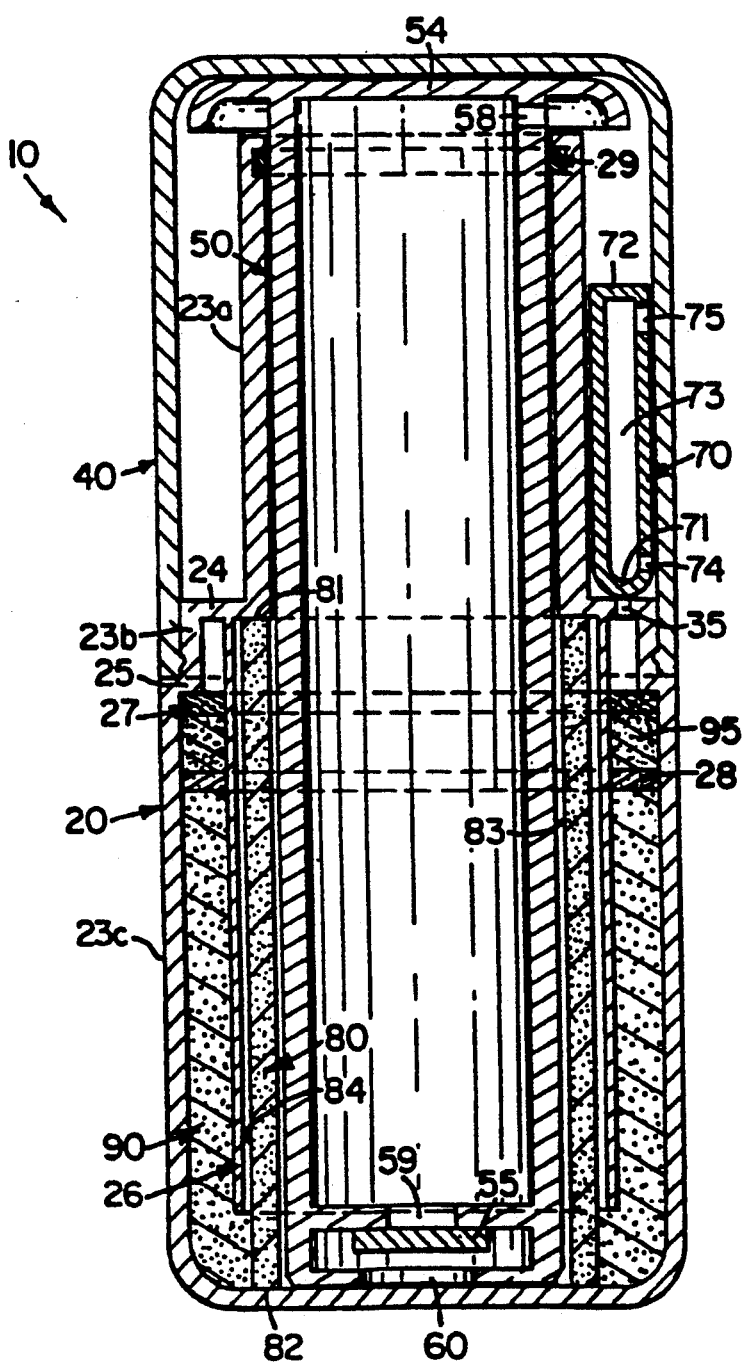

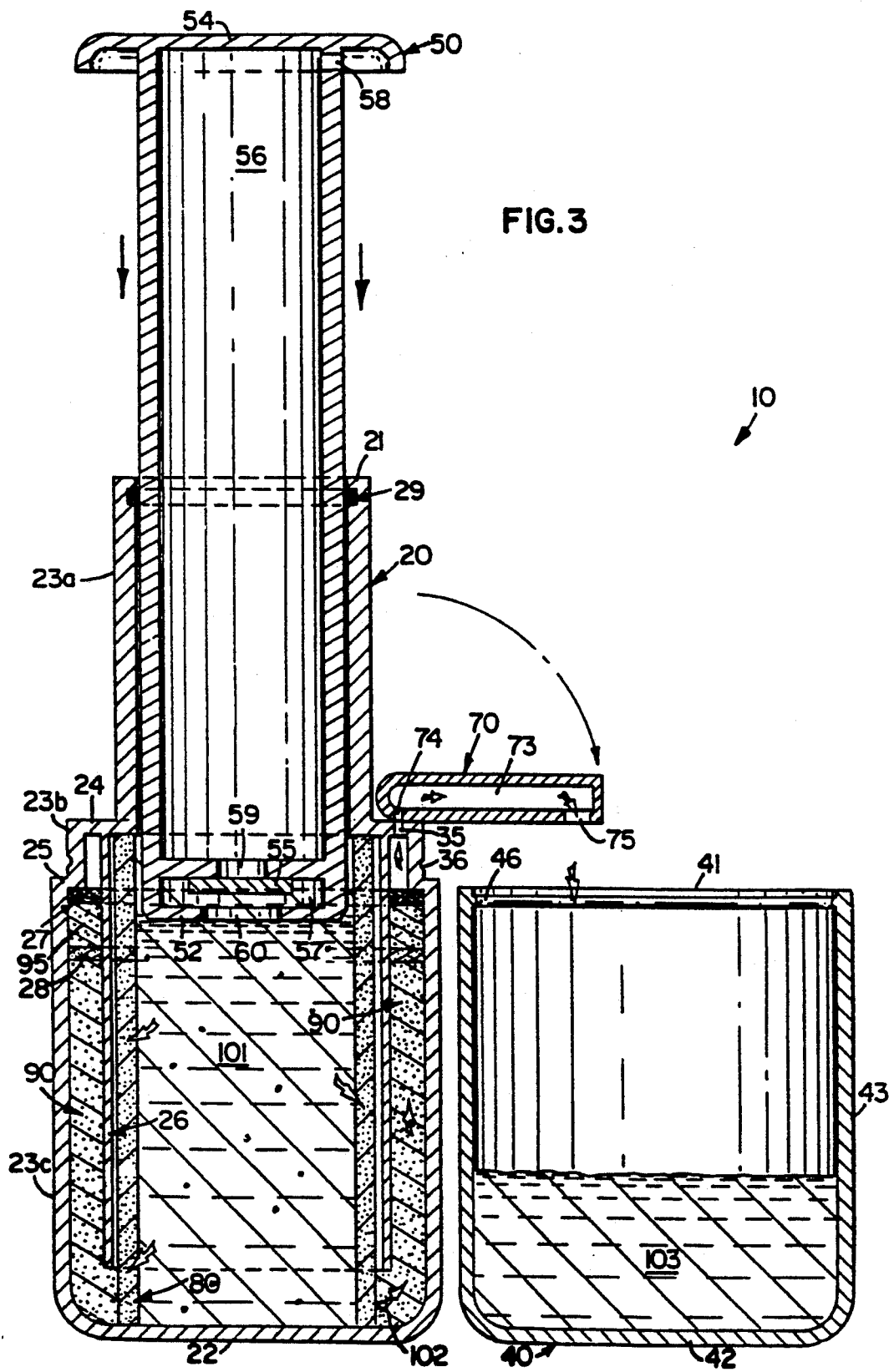

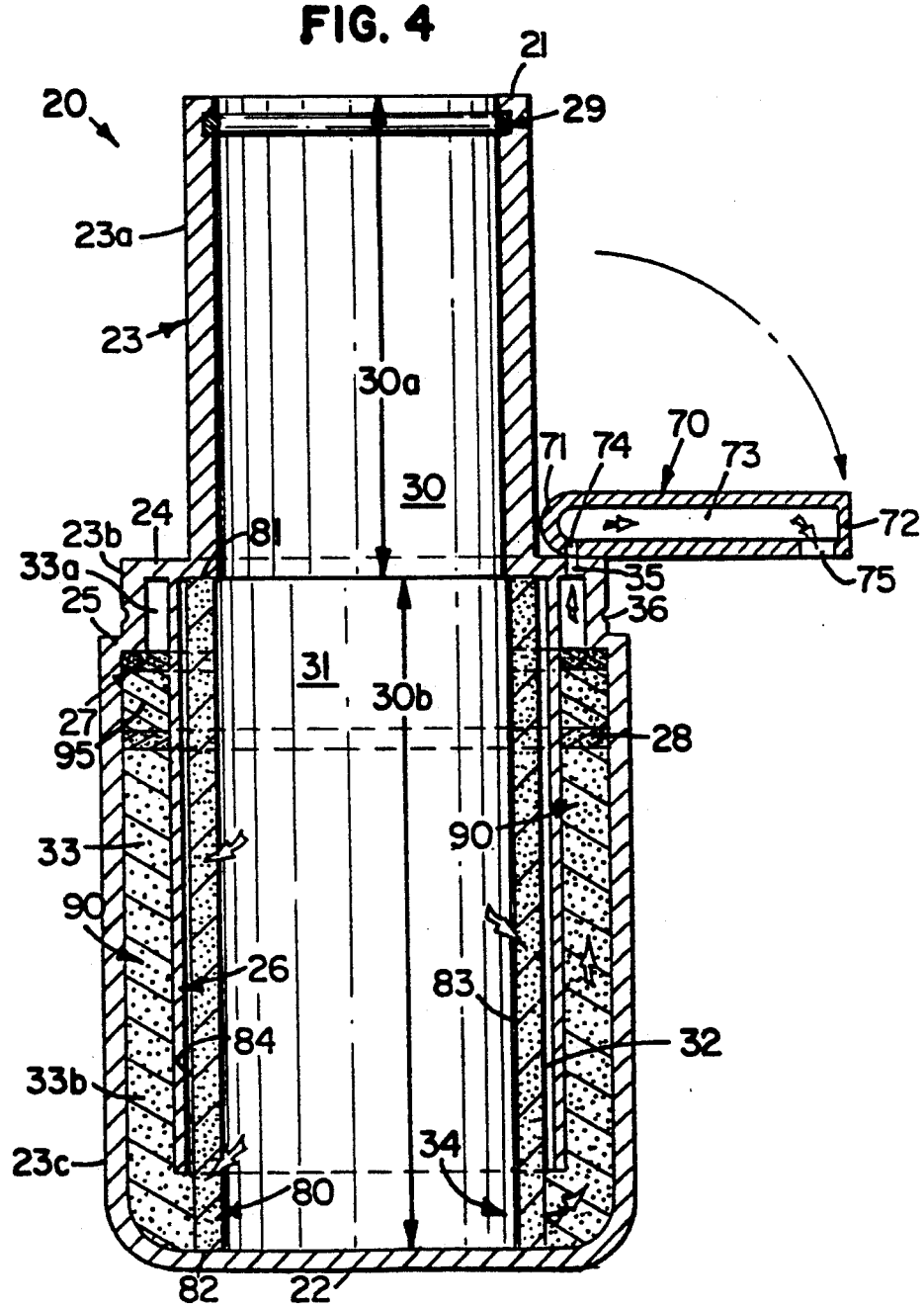

PORTABLE WATER PURIFICATION SYSTEM

This is a continuation of application Ser. No. 07/503,635, filed Apr. 5, 1990.

TECHNICAL FIELD

Broadly, the invention relates to water purification systems. Specifically, the invention relates to portable water purification systems which include both a filter for physically removing particulate contaminants and larger pathogens from the water and a porous body of biocidally effective material for chemically disinfecting the water.

BACKGROUND

Sources of fresh water are often contaminated with disagreeable suspended solids and/or harmful pathogens including parasites such as schistosoma, cysts such as Giardia, bacteria such as cholera and viruses such as hepatitis.

Various methods are available for producing potable water from fresh water sources contaminated with suspended solids and/or pathogens. Selection of the most appropriate method requires assessment and balancing of the output requirements, energy availability, and size restrictions.

The most constraining situation in the design of a purification system is the design of a readily transportable system capable of microbiologically purifying water contaminated with both larger pathogens such as cysts (about 6 microns in diameter) which are resistant to chemical disinfection and smaller pathogens such as viruses (about 0.05 microns in diameter) which are difficult to filter.

One method employed to microbiologically purify contaminated water attempts to chemically disinfect the water by dissolving a biocide into the water or percolating the water through a biocidally active porous resin. Exemplary of the chemical disinfection method are U.S. Pat. Nos. 4,151,092 and 4,298,475.

U.S. Pat. No. 4,151,092, issued to Grimm et al., discloses a portable water purification system that includes (i) a supply of biocidally effective tablets, (ii) a first container for retaining a supply of contaminated water treated with the biocide disinfectant, (iii) a second container sealingly receivable within the first container for exerting pressure upon the treated water contained within the first container when forced downward into the first container, and (iv) a replaceable filter cartridge coupled to the base of the second container for filtering the treated water retained within the first container as the water is forced from the first container into the second container. The filter cartridge includes a polyethylene filter to remove suspended solids, a layer of activated carbon to remove the biocide and other distasteful contaminants, and a layer of felt to retain the activated carbon. While generally effective, chemical disinfection requires that the contaminated water be treated for upwards of thirty minutes with the biocide prior to removal of the biocide by passage through the activated carbon and/or consumption of the water.

U.S. Pat. No. 4,298,475, issued to Gartner, discloses a portable water purification system operable by mouth suction which comprises a straw sequentially containing filter media for removing suspended solids form the water, biocidally active anion exchange resin for chemically disinfecting the water, filter media for further removing suspended solids, activated carbon for removing distasteful contaminants including residual disinfecting chemical, and filter media for retaining the activated carbon. Gartner does not discuss the pore sizes of the filter medias.

A second method employed to microbiologically purify contaminated water attempts to filter the pathogens from the contaminated water employing a microfilter. While this method can be effective for removing the larger pathogens such as cysts and bacteria, such systems are generally ineffective for removing the smaller pathogens such as viruses, require significant operating energy, produce modest quantities of filtered water, and require frequent filter replacement.

Accordingly, a substantial need exists for a simple and efficient, manually operable, portable, water purification system that can produce significant quantities of microbiologically purified water with minimal effort.

BRIEF DESCRIPTION OF THE DRAWINGS

FIG. 1 is a perspective view of one embodiment of the invention in compacted storage form.

FIG. 2 is a cross-sectional front view of the invention embodiment depicted in FIG. 1 taken along line 2—2.

FIG. 3 is a cross-sectional view of the invention embodiment depicted in FIG. 2 in operational form.

FIG. 4 is a cross-sectional view of the first container portion of the invention embodiment depicted in FIG. 2.

SUMMARY

Figure 5:
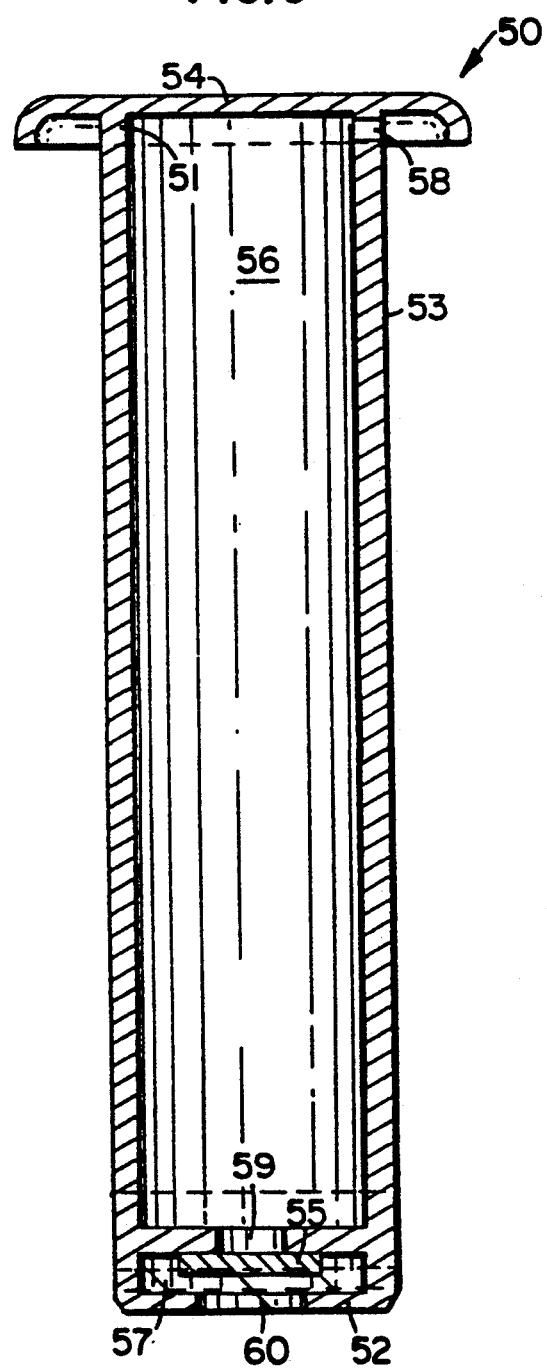
FIG. 5 is a cross-sectional view of the plunger portion of the invention embodiment depicted in FIG. 2.
Figure 6:
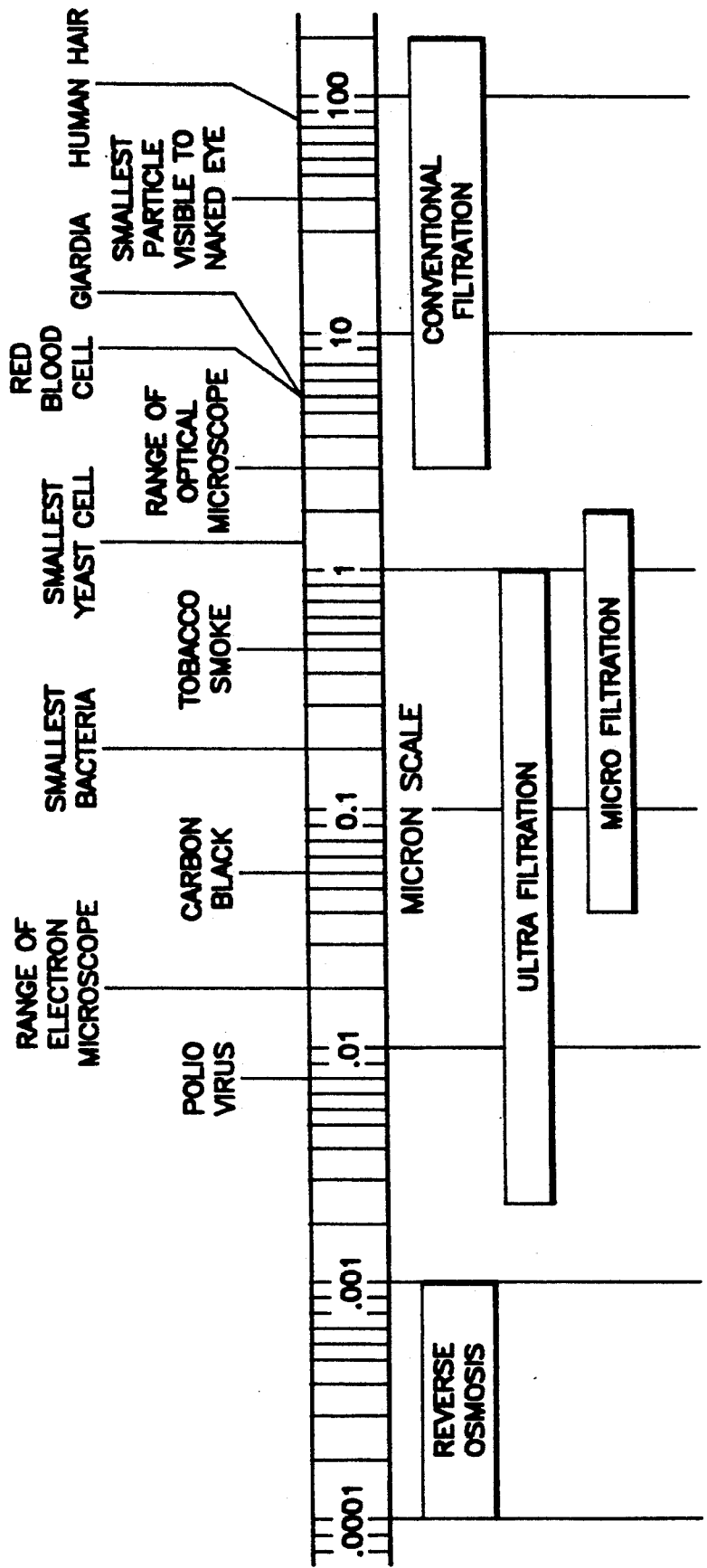
FIG. 6 is a logarithmic micron scale indicating the sizes of various particles.

A manually operable apparatus for producing potable water from contaminated water which includes (i) a first container having an open end and an outlet orifice, (ii) a filter operably positioned within the first container for filtering contaminated water placed within the first container as the contaminated water is forced out of the first container through the outlet orifice, (iii) a porous body of biocidally effective material operably positioned within the first container for disinfecting contaminated water placed within the first container as the contaminated water is forced out of the first container through the outlet orifice, and (iv) a plunger sealably receivable within the first container through the open end for forcing contaminated water retained within the first container through the filter and the porous body of biocidally effective material and out of the first container through the outlet orifice.

The apparatus further includes (i) a means for abating the formation of a vacuum within the first chamber as the plunger is withdrawn from the first container, (ii) a nozzle in hinged communication with the outlet orifice in the first container for sealing the outlet orifice when placed in a first position and directing the flow of potable water flowing out of the first container through the outlet orifice when placed in a second position, and (iii) a second container having an open end which is operable as a drinking cup for the potable water generated by the system and as a cover for the first container.

DEFINITIONS

As utilized herein, the phrases "microbiologically purified" and "microbiological purification", when used in connection with microbiologically contaminated water, means sufficient removal and/or deactivation of potentially harmful cysts, bacteria and viruses so as to render the water microbiologically potable.

DETAILED DESCRIPTION OF ONE EMBODIMENT OF THE INVENTION INCLUDING A BEST MODE

Construction

The invention is a compact, manually operable, portable water purification system capable of producing significant quantities of potable water.

The system will be described with respect to the invention embodiment depicted in FIGS. 1-5 wherein common reference numbers are maintained throughout the Figures in accordance with the Nomenclature established above.

Referring to FIGS. 1 through 3, the system 10 includes (i) a cylindrical first container 20 which accommodates a filter 80 and a porous body of biocidally effective material 90 and is operable for retaining a quantity of contaminated water 101 to be purified, (ii) a cylindrical second container 40 operable as a cover for the first container 20 and as a receptacle for retaining the potable water 103 generated by the system 10, and (iii) a cylindrical plunger 50 telescopingly and sealingly receivable within the first container 20 for forcing contaminated water 101 retained within the first container 20 through the filter 80 and the porous body of biocidally effective material 90 accommodated within the first container 20.

Referring to FIG. 4, the first container 20 defines a cylindrical first chamber 30 which is subdivided into an upper portion 30a and a lower portion 30b by an upper horizontal annular flange 24 which changes the diameter of the cylindrical first chamber 30. The upper portion 30a of the first chamber 30 has a smaller diameter than the lower portion 30b of the first chamber 30.

The first container 20 also includes a lower horizontal annular flange 25 immediately below the upper horizontal annular flange 24 which further increases the diameter of the lower portion 30b of the first chamber 30. The upper 24 and lower 25 horizontal annular flanges divide the container sidewall 23 into an upper sidewall section 23a between the top 21 of the first container 20 and the upper horizontal annular flange 24, a middle sidewall section 23b between the upper 24 and a lower 25 horizontal annular flanges, and a lower sidewall section 23c between the lower horizontal annular flange 25 and the bottom 22 of the first container 20.

A cylindrical baffle 26 extends vertically within the first chamber 30 from the upper horizontal flange 24 to proximate the bottom 22 of the first container 20. The baffle 26 terminates above the bottom 22 of the first container 20 so as to define an annular passage 34 around the baffle 26.

The filter 80 accommodated within the firs container 20 is cylindrical in shape and positioned inside the baffle 26. The top 81 and bottom 82 of the filter 80 are sealingly coupled to the upper horizontal annular flange 24 and the bottom 22 of the first container 20 respectively. The filter 80 and baffle 26 separate the lower portion 30b of the first chamber 30 into (i) a central cylindrical cavity 31 defined by the filter 80, (ii) an inner annular cavity 32 defined by the filter 80 and the baffle 26, and (iii) an outer annular cavity 33 defined by the baffle 26 and the lower section 23c of the sidewall 23.

The inner surface 83 of the filter 80 is substantially vertically aligned with the inner surface of the upper portion 30a of the first container 30 so as to provide a substantially continuous surface to reduce the space provided between the sidewall of the plunger 50 and the sidewall of the first container 20 and the interior surface of the filter 80.

A first annular screen 27 is positioned within the outer annular cavity 33 in abutment with the lower horizontal annular flange 25 and separates the outer annular cavity 33 into an upper portion 33a and a lower portion 33b. The upper portion 33a of the outer annular cavity 33 is defined by the upper horizontal annular flange 24, the middle section 23b of the first container sidewall 23, the baffle 26, and the first annular screen 27. The lower portion 33b of the outer annular cavity 33 is defined by the first annular screen 27, the lower section 23c of the first container sidewall 23, the baffle 26, and the bottom 22 of the first container 20.

An outlet orifice 35 for the upper portion 33a of the outer annular cavity 33 extends through the upper horizontal flange 24.

The lower portion 33b of the outer annular cavity 33 is packed with a layer of porous biocidally active material 90 and optionally with one or more layers of an active component 95 such as a layer of activated carbon for removing molecules which contribute undesired taste and odor, a layer of a chelating agent to remove hardness ions, and the like. The first screen 27 prevents the biocidally effective material 90 and/or optional active component(s) 95 from flowing out of the first container 20 through the outlet orifice 35 along with the purified water ***.

The filter 80, baffle 26, screen 27, and biocidally effective material 90 may be retained within a replaceable cartridge (not shown) which is threadably engageable within the lower portion 30b of the first chamber 30 so as to sealingly contact the upper horizontal flange 24. The bottom of the cartridge (not shown) would form the bottom 22 of the first container 20 while the sides of the cartridge (not shown) would define a double sidewall with the lower section 23c of the first container sidewall 23.

A nozzle 70 is hingedly coupled to the first container 20 at the upper horizontal flange 24 and placed in fluid communication with the outlet orifice 35 in the first container 20. The proximal end 71 of the nozzle 70 is rounded so as to permit hinged rotation of the nozzle 70 about the outlet orifice 35 in the first container 20 while permitting the proximal end 71 of the nozzle 70 to seal the outlet orifice 35 in the first container 20 when positioned parallel to the first container 20. Sealing of the outlet orifice 35 in the first container 20 prevents deactivation of the biocidally effective material 90 by preventing the material 90 from drying out.

The nozzle 70 has an inlet orifice 74 proximate the proximal end 71 of the nozzle 70 and an outlet orifice 75 proximate the distal end 72 of the nozzle 70. A passageway 73 extends through the nozzle 70 and connects the inlet 74 and outlet 75 orifices. The inlet orifice 74 is configured so that the orifice 74 aligns with the outlet orifice 35 in the first container 20 when the nozzle 70 is positioned to extend substantially transversely to the first container 20. The outlet orifice 75 is configured so that purified water 103 exits the nozzle 70 in a downward fashion.

Referring to FIG. 3, the second container 40 has an open top 41 and is configured for use as a cover for the first container 20 and as a receptacle for the potable water 103 generated by the system 10. An inwardly extending annular rib 46 is provided on the sidewall 43 of the second container 40 proximate the top 41 of the second container 40. The rib 46 is compatible with an annular notch 36 in the middle section 23b of the first container sidewall 23 for securing the second container 40 over the first container 20. The second container 40 is sized to provide a gap between the upper sidewall section 23a of the first container 20 and the sidewall 43 of the second container 40 which is sufficient to accommodate the nozzle 70 when the nozzle 70 is positioned parallel to the first container 20.

Referring to FIG. 5, the plunger 50 is configured to be telescopically received within the upper portion 30a of the first chamber 30 and the central cylindrical cavity 31 subdivision of the lower portion 30b of the first chamber 30. Accordingly, the body of the plunger 50 is constructed as a right circular cylinder with a diameter slightly smaller than the smaller of the diameter of the upper portion 30a of the first chamber and the diameter of the central cavity 31. The proximal end 51 of the plunger 50 is capped with a head 54 which provides a smooth, flat surface against which the palm of the hand may be comfortably placed for forcing the plunger 50 into the first container 20 and applying pressure to the supply of contaminated water 101 retained within the first container 20. The plunger 50 defines an upper chamber 56 and a lower chamber 57. An upper orifice 58 extends through the sidewall 53 of the plunger 50 proximate the proximal end 51 of the plunger 50 for providing access from the upper chamber 56 to the atmosphere. A middle orifice 59 connects the upper chamber 56 and the lower chamber 57. A lower orifice 60 extends through the distal end 52 of the plunger 50 for providing access from the first chamber 30 defined by the first container 20 into the lower chamber 57 defined by the plunger 50. The combination of upper 56 and lower 57 chambers along with the interconnecting upper 58, middle 59, and lower 60 orifices provide a continuous passage from the first chamber 30 to the atmosphere.

A check valve 55, comprising a free-floating disc with several holes extending through the periphery of the disc, is configured within the lower chamber 57 so as to prevent flow through the smaller middle orifice 59 while the plunger 50 is being inserted into the first container 20 but permit flow through the larger lower orifice 60 while the plunger 50 is being withdrawn from the first container 20. The check valve 55 functions to permit the plunger 50 to build pressure within the first chamber 30 during insertion while abating the formation of a vacuum within the first chamber 30 during withdrawal.

The relative heights of the plunger 50 and the first chamber 30 are such that the upper orifice 58 in the sidewall 53 of the plunger 50 will remain in constant communication with the atmosphere. Positioning of the upper orifice 58 within the first chamber 30 would prevent flow from the first chamber 30 to the atmosphere and result in the creation of a vacuum within the first chamber 30 when the plunger 50 is being withdrawn from the first chamber 30 until the upper orifice 58 is moved out of the first chamber 30.

A seal 29 is provided proximate the top 21 of the first container 20 to sealingly engage the sidewall 53 of the plunger 50.

The first container 20, second container 40, and plunger 50 may be constructed from any suitable structural material including wood, metal and plastic with molded plastic constituting the material of choice. ***
The filter 80 functions to remove both suspended solids and larger pathogens from the contaminated water 101. Removal of the suspended solids renders the water aesthetically agreeable and palatably acceptable. Generally, removal of those suspended solids which are visible to the naked eye (greater than about 40 microns) achieves the desired results. Removal of the larger pathogens is necessary because such pathogens are effectively resistant to chemical disinfection by the biocidally effective material 90. The larger pathogens generally resistant to chemical disinfection are cysts such as Giardia lamblia and Giardia muris which are typically about 6 microns in size. Because of the significantly smaller size of the pathogens which must be removed (6 microns) as compared to the suspended solids (40 microns), pathogen removal controls selection of the filter media 80.

The United States Environmental Protection Agency recommends that microbiological water purifiers achieve at least a three-log (99.9%) reduction in the concentration of cysts such as Giardia lamblia and Giardia muris which are difficult to control by chemical means. Accordingly, the filter media 80 employed in the present invention should be capable of ensuring at least a three-log reduction in the concentration of cysts such as Giardia lamblia and Giardia muris.

The filter 80 may be constructed from any porous material capable of providing the necessary cyst reduction, structural integrity and chemical compatibility including carbon block, ceramic, woven and nonwoven fiber, natural and synthetic membranes, and the like.

The biocidally effective material 90 may be any sufficiently porous, biocidally effective material capable of disinfecting contaminated water with a single pass. Examples of biocidally effective materials suitable for use in the present invention are disclosed in U.S. Pat. Nos. 4,238,477 and 3,817,860 issued to Lambert et al. Briefly, these references describe iodinated anion exchange resins, such a iodinated quaternary ammonium resins, which are effective for disinfecting contaminated water by percolation of the contaminated water through the resin.

The amount of biocidally effective resin 90 which should be employed within the system 10 depends upon a number of factors including the type and porosity of the biocidally effective resin, the configuration of the biocidally effective resin within the system 10, the rate of water flow through the system, and others. Generally, when an iodinated anion exchange resin is employed, the volumetric ratio of resin to water passing through the resin every second should be at least 2.5 and preferably at least 3.

The first screen 27 may be constructed from any suitably porous material capable of retaining the biocidally effective material 90 and the optional active component(s) 95 in the lower portion 33b of the outer annular cavity 33 while permitting substantially unrestricted flow of potable water through the screen 27. The second screen 28 may be constructed from any suitably porous material capable of maintaining separation of the biocidally effective material 90 and the optional active component(s) 95 while permitting substantially unrestricted flow of potable water through the screen 28. Suitable materials for use as the screens 27,28 include woven and nonwoven fibers of plastic, glass or other material which is chemically compatible with the biocidally effective material 90.

A layer(s) of an active component(s) 95 may optionally be placed within the lower portion 33b of the outer annular cavity 33 downstream from the biocidally effective material 90 for achieving a desired effect upon the purified water 103 such as a layer of activated carbon to remove undesirable tastes and odors, and/or a chelating agent to remove hardness ions from the purified water 103. When a layer(s) of the optional active component(s) 95 is employed, a second annular screen 28 should be placed between the layer of biocidally effective material 90 and the optional layer(s) of active component(s) 95 as well as between layers of active components 95 when multiple layers r of different active components are employed (not shown) to maintain separation of the materials 90,95.

The system 10 may be constructed to substantially any size but should generally provide a contaminated water 101 retention volume (displacement) defined by the first chamber upper portion 30A and the first chamber central cavity subdivision 31 of about 0.05 to about 0.2 liters. A system 10 providing a displacement of less than about 0.05 liters is laborious to operate because of the number of strokes required while a system 10 providing a displacement of greater than about 0.2 liters excessively cumbersome to transport and requires the use of significant energy to operate.

A typical system 10 providing a displacement of about 100 ml requires about 4 to about 10 seconds to fully depress the plunger 50 when the lower portion of the first chamber is filled with contaminated water 101.

Depending upon several variables including the type of biocidally effective material 90 employed and the material of construction, a system 10 providing a displacement of about 100 to 200 ml will typically weight about 300 to about 500 grams.

Depending upon various factors including the average pore size and porosity of the filter 80, the average pore size and porosity of the biocidally effective material 90, and the number and type of additional active components 95, a typical system 10 should cause a pressure drop between the central cavity 31 and the outlet orifice 35 in the first container 20 of about 5 to about 10 psig.

Operation

Referring to FIG. 3, operation of the system 10 includes the steps of (i) separating the first 20 and second 40 containers, (ii) withdrawing the plunger 50 from the first container 20, (iii) pouring a supply of contaminated water 101 into the first container 20 through the open top 21, (iv) opening the outlet orifice 35 in the first container 20 by rotating the nozzle 70 from the parallel position to the transverse position, (v) positioning the second container 40 under the outlet o orifice 75 in the nozzle 70, (vi) reinserting the plunger 50 into the first container 20, and (vii) applying pressure to the contaminated water 101 retained within the first container 20 by pushing the plunger 50 against the contaminated water 101.

Alternatively, steps (ii) and (iii) may be modified to (ii) depressing the plunger 50 completely into the first container 20, (iii)(a) pouring a supply of contaminated water 101 into the upper chamber 56 of the plunger 50 through the upper orifice 58 in the plunger 50 (preferably positioned through the head 54 of the plunger 50), and (iii)(b) pulling upward on the plunger 50 so as to open the check-valve 55 and suction the contaminated water 101 retained within the upper chamber 56 of the plunger 50 into the first chamber central cavity subdivision 31 and first chamber upper portion 30A.

The application of pressure to the contaminated water 101 retained within the first container 20 causes the contaminated water 101 to flow from the central cavity 31 through the filter 80 and into the inner annular cavity 32. The baffle 26 then directs the filtered water 102 in the inner annular cavity 32 down towards the annular passage 34 between the baffle 26 and the bottom 22 of the first container 20. The filtered water 102 passes through the annular passage 34 into the lower portion 33b of the outer annular cavity 33 where the filtered water 102 percolates up through the biocidally effective material 90 and the activated carbon 95 retained within the lower portion 33b of the outer annular cavity 33. The potable water 103 then passes from the lower portion 33b of the outer annular cavity 33 through the screen 27, into the upper portion 33a of the outer annular cavity 33, out of the first container 20 through the outlet orifice 35 in the first container 20, into the nozzle 70 through the inlet orifice 74 in the nozzle 70, and out of the nozzle 70 through the outlet orifice 75 in the nozzle 70.

I claim:

1. An apparatus for producing potable water from microbiologically contaminated water comprising:
   (a) a first container having a first chamber for retaining contaminated water and a second chamber,
   (b) a filter interposed between the first chamber and the second chamber such that an inner surface of the filter is in direct fluid communication with the first chamber and an outer surface of the filter is in direct fluid communication with the second chamber,
   (c) a porous body of biocidally effective material disposed within the second chamber, and
   (d) a plunger receivable within the first chamber and comprising means for forcing contaminated water retained within the first chamber through the filter and the porous body of biocidally effective material so as to microbiologically purify the contaminated water, and
   (d) a means, in fluid communication with the first chamber, for abating the formation of a vacuum within the first chamber when the plunger is withdrawn from the first chamber and thereby reducing the return passage of fluid through the filter from the second chamber into the first chamber.

2. The apparatus of claim 1 wherein the apparatus defines a single, consolidated, compact body when operationally assembled.

3. The apparatus of claim 1 further comprising a second container comprising means for coupling with the first container to completely enclose the plunger.

4. The apparatus of claim 1 wherein the filter divides the first and second chambers so as to configure the first chamber as a substantially cylindrical cavity and configure the second chamber as a substantially annular cavity surrounding the first chamber.

5. The apparatus of claim 4 wherein the means for abating the formation of a vacuum within the first chamber comprises (i) a passage directly connecting the first chamber and the atmosphere, and (ii) a one-way valve within the passage which prevents fluid flow through the passage as the plunger moves in a first direction and permits fluid flow through the passage as the plunger moves in a second direction.

6. The apparatus of claim 5 wherein the one-way valve is effective for preventing fluid flow through the passage as the plunger is inserted into the first chamber and effective for permitting fluid flow through the passage as the plunger is withdrawn from the first chamber.

7. The apparatus of claim 5 wherein the passage extends through the plunger.

8. An apparatus for producing microbiologically potable water from contaminated water comprising:
   (a) a first cylindrical container having an open end and an outlet orifice and defining an upper cylindrical chamber having a first diameter and a lower cylindrical chamber having a second diameter wherein the second diameter is greater than the first diameter,
   (b) a cylindrical filter operably positioned within the lower cylindrical chamber of the first container so as to divide the lower chamber into a central cavity longitudinally aligned with the upper chamber and an annular cavity surrounding the central cavity,
   (c) a cylindrical baffle dividing the annular cavity into an inner annular cavity and an outer annular cavity for directing flow downwardly through the inner annular cavity and upwardly through the outer annular cavity,
   (d) a porous body of biocidally effective material operably positioned within the outer annular cavity, and
   (e) a plunger sealably and reciprocally retained within the first container through the open end for forcing contaminated water retained within the central cavity through the filter, around the baffle, through the porous body of biocidally effective material, and out of the first container through the outlet orifice.

9. The apparatus of claim 8 wherein the apparatus defines a single, consolidated, compact body when operationally assembled.

10. The apparatus of claim 8 further comprising a second container comprising means for coupling with the first container to completely enclose the plunger.

11. The apparatus of claim 8 further comprising a means for abating the formation of a vacuum within the first container which comprises a longitudinal passageway through the plunger and a check-valve in communication with the passageway for sealing the passageway as the plunger is inserted into the container and for opening the passageway as the plunger is withdrawn from the container.

* * * * *

UNITED STATES PATENT AND TRADEMARK OFFICE
CERTIFICATE OF CORRECTION

Page 1 of 4

PATENT NO. : 5,268,093
DATED : December 7, 1993
INVENTOR(S) : Richard D. Hembree, et al.

It is certified that error appears in the above-identified patent and that said Letters Patent is hereby corrected as shown below:

Column 3, line 7, before the word "Construction", insert --Nomenclature

| | |
|---|---|
| 10 | water purification system |
| 20 | first container |
| 21 | top of first container |
| 22 | bottom of first container |
| 23 | sidewall of first container |
| 23a | upper section of sidewall |
| 23b | middle section of sidewall |
| 23c | lower section of sidewall |
| 24 | upper horizontal flange |
| 25 | lower horizontal flange |
| 26 | baffle |
| 27 | first screen |
| 28 | second screen |
| 29 | seal |
| 30 | first chamber |
| 30a | upper portion of first chamber |
| 30b | lower portion of first chamber |
| 31 | central cavity subdivision of first chamber |
| 32 | inner annular cavity subdivision of first chamber |
| 33 | outer annular cavity subdivision of first chamber |
| 33a | upper portion of outer annular cavity |
| 33b | lower portion of outer annular cavity |
| 34 | passage between inner and outer annular cavities |

UNITED STATES PATENT AND TRADEMARK OFFICE
CERTIFICATE OF CORRECTION

PATENT NO. : 5,268,093
DATED : December 7, 1993
INVENTOR(S) : Richard D. Hembree, et al.

It is certified that error appears in the above-identified patent and that said Letters Patent is hereby corrected as shown below:

```
35    outlet orifice
36    annular notch 40    second container
41    top of second container
42    bottom of second container
43    sidewall of second container
46    annular rib 50    plunger
51    proximal end of plunger
52    distal end of plunger
53    sidewall of plunger
54    head
55    check-valve
56    upper chamber
57    lower chamber
58    upper orifice
59    middle orifice
60    lower orifice 70    nozzle 71    proximal end of nozzle
72    distal end of nozzle
73    passage through nozzle
74    inlet orifice
75    outlet orifice 80    filter
81    top of filter
```

UNITED STATES PATENT AND TRADEMARK OFFICE
CERTIFICATE OF CORRECTION

Page 3 of 4

PATENT NO.   :   5,268,093
DATED        :   December 7, 1993
INVENTOR(S)  :   Richard D. Hembree, et al.

It is certified that error appears in the above-identified patent and that said Letters Patent is hereby corrected as shown below:

```
82    bottom of filter
83    inner face of filter
84    outer face of filter 90    biocidally effective resin 95    optional active component 101   contaminated water
102   filtered water
103   potable/purified water--
```

Column 3, line 56, "firs" should read --first--.

Column 7, line 15, delete "r" after the word "layers".

Column 7, line 26, insert --is-- after the word "liters".

Column 7, line 36, "weight" should read --weigh--.

Column 7, line 56, delete "o" after the word "outlet".

UNITED STATES PATENT AND TRADEMARK OFFICE
CERTIFICATE OF CORRECTION

PATENT NO. : 5,268,093
DATED : December 7, 1993
INVENTOR(S) : Richard D. Hembree, et. al.

It is certified that error appears in the above-indentified patent and that said Letters Patent is hereby corrected as shown below:

Column 7, line 56, delete "o" after the word "outlet".

Signed and Sealed this

Twentieth Day of September, 1994

Attest:

BRUCE LEHMAN

Attesting Officer

Commissioner of Patents and Trademarks